United States Patent [19]

Kay

[11] 4,320,955
[45] Mar. 23, 1982

[54] COPY REPRODUCTION APPARATUS

[75] Inventor: David B. Kay, Rochester, N.Y.

[73] Assignee: Xerox Corporation, Stamford, Conn.

[21] Appl. No.: 111,554

[22] Filed: Jan. 14, 1980

[51] Int. Cl.$^3$ .................... G03G 15/04; G03G 15/30; H04N 1/30

[52] U.S. Cl. ....................................... 355/3 R; 355/8; 355/14 R; 358/300; 430/31

[58] Field of Search .................. 355/3 R, 8, 11, 14 R, 355/14 C, 14 TR, 77; 358/300; 430/31

[56] References Cited

U.S. PATENT DOCUMENTS

| | | | |
|---|---|---|---|
| 3,051,044 | 8/1962 | McNaney | 355/11 |
| 3,455,637 | 7/1969 | Howard . | |
| 3,603,730 | 9/1971 | Weigl et al. . | |
| 3,681,527 | 8/1972 | Nishiyama et al. | 355/3 R |
| 3,845,239 | 10/1974 | Granzow et al. . | |
| 4,012,585 | 3/1977 | Chen | 358/285 |
| 4,015,081 | 3/1977 | Starkweather | 358/300 |
| 4,042,962 | 8/1977 | Yamaji et al. | 358/300 |
| 4,046,471 | 9/1977 | Branham et al. | 358/300 |
| 4,080,058 | 3/1978 | Stephany et al. | 355/3 R X |
| 4,124,286 | 11/1978 | Barasch | 355/3 R |
| 4,200,390 | 4/1980 | Tagashira et al. | 355/3 R X |
| 4,241,990 | 12/1980 | Fisli | 355/8 X |

FOREIGN PATENT DOCUMENTS 54-53195  4/1979  Japan .

OTHER PUBLICATIONS

EPO Pub. 2,102; 5/30/1979-Xerographic Printer/Copier by Distephano et al.
IBM Disclosure Bulletin vol. 15, No. 10; Mar. 1973–"Triple Function Box"–R. A. Thorpe.
IBM Disclosure Bulletin vol. 19, No. 3; Aug. 1976–"Laser Copier/Printer" by G. T. Williams.

Primary Examiner—Gene Z. Rubinson
Assistant Examiner—Richard M. Moose
Attorney, Agent, or Firm—Frederick E. McMullen

[57] ABSTRACT

A multiple function image processing system having both light-lens and flying spot beam for producing latent electrostatic images of originals on a photoconductive surface. The images are developed and transferred to a copy substrate material. A flying spot image reading beam enables the developed images to be read. Where multiple copies are desired, the light/lens provides the first image with later copies provided by the flying spot beams which scan each developed image and, using image signals produced by said scanning, write the next successive image until the desired number of copies are produced. Where a relatively large number of copies are desired, the image signals produced by scanning the developed image are stored in memory, which is thereafter used as the source of image signals for subsequent copies.

18 Claims, 2 Drawing Figures

COPY REPRODUCTION APPARATUS

This invention relates to an image processing apparatus and method, and more particularly to a multiple function image processing apparatus and method.

When producing multiple copies of an original document, conventional xerographic type copiers and duplicators repeatedly expose the original document to provide the desired number of copies. To permit this, the original document, which is initially placed at a viewing station or platen, is held there until the last exposure has been made. Following this, the document is removed, either manually or automatically by a document handler to clear the platen for the next document. To save time, particularly in the case of automatic document handling systems, the next document is brought forward to the platen as the preceding document is removed.

An important factor insofar as most copier/duplicators are concerned is copying speed, which is normally expressed in terms of number of copies produced per minute. However, this expression of copier performance only refers to continuous or sustained operation, that is, operation where the same original document is repeatedly copied. It does not account for time spent changing documents and in that event, the copying speed is reduced, sometimes markedly where only a minimum number of copies per original are made.

Since a great emphasis is placed on copying speed, interest is high in reducing the time interval required to switch from one document to another as this leads directly to an increase in overall copier thruput speed. But despite improvements in the art and the use of automatic document handling devices, an interrupt in the copying process is still the norm when changing from the document to the next.

The invention relates to a copying apparatus comprising in combination: a photoreceptor, means to charge the photoreceptor in preparation for imaging, exposure means for exposing the charged photoreceptor to an original to produce a latent electrostatic image thereof, developing means to develop the image, transfer means for transferring the developed image to copy substrate material, and combined image read/write means operable to scan the image on the photoreceptor to provide image signals representative of the image, and to expose the photoreceptor in accordance with the image signals obtained to reproduce the latent electrostatic image without using the original.

The invention further relates to a method of producing multiple copies of an original in which the original is only required for the first copy comprising the steps of: for a first copy, producing a latent electrostatic image of the original on a charged photoconductive surface; for a second copy, raster scanning the image with a flying spot beam to provide video image signals representative of the image scanned and reexposing the photoreceptor by scanning the photoreceptor with a second flying spot beam modulated in accordance with image signals produced by the preceding step to provide a second latent electrostatic image of the original; for each additional copy, repeating the steps of scanning the preceding image and exposing the photoreceptor using image signals derived by scanning to provide additional images; and for each image produced, developing the image either before or after scanning, and transferring the developed images to a copy substrate material to provide the first, second, and any additional copies.

The invention further relates to a copying apparatus having a photoreceptor, means to charge the photoreceptor in preparation for imaging, exposure means for exposing the charged photoreceptor to produce latent electrostatic images, developing means for developing the images, transfer means for transferring the developed images to copy substrate material, a beam of electromagnetic radiation, means to focus the beam onto the photoreceptor at a location downstream of the developing means to enable the beam to scan images on the photoreceptor after the images are developed, scanning means for scanning the beam across the photoreceptor and the developed images thereon, and means for collecting radiation from the photoreceptor as the beam scans across the photoreceptor and the developed images thereon and converting the radiation collected to image signals representative of the developed images scanned.

There is shown herein a multi-mode reproduction apparatus operable selectively in a COPY mode to xerographically make copies of original documents in the manner typical of xerographic copiers or machines, in a WRITE mode to xerographically produce copies using a flying spot type scanner where the original comprises video image signals, in a READ mode to read images developed on the machine photoreceptor with the same flying spot scanner to produce image signals representative thereof, and in a multiple copy mode wherein through the use of the aforementioned COPY, WRITE and READ modes multiple copies of an original are made. This latter mode permits the original to be dispensed with after the first copy.

Figure 1:
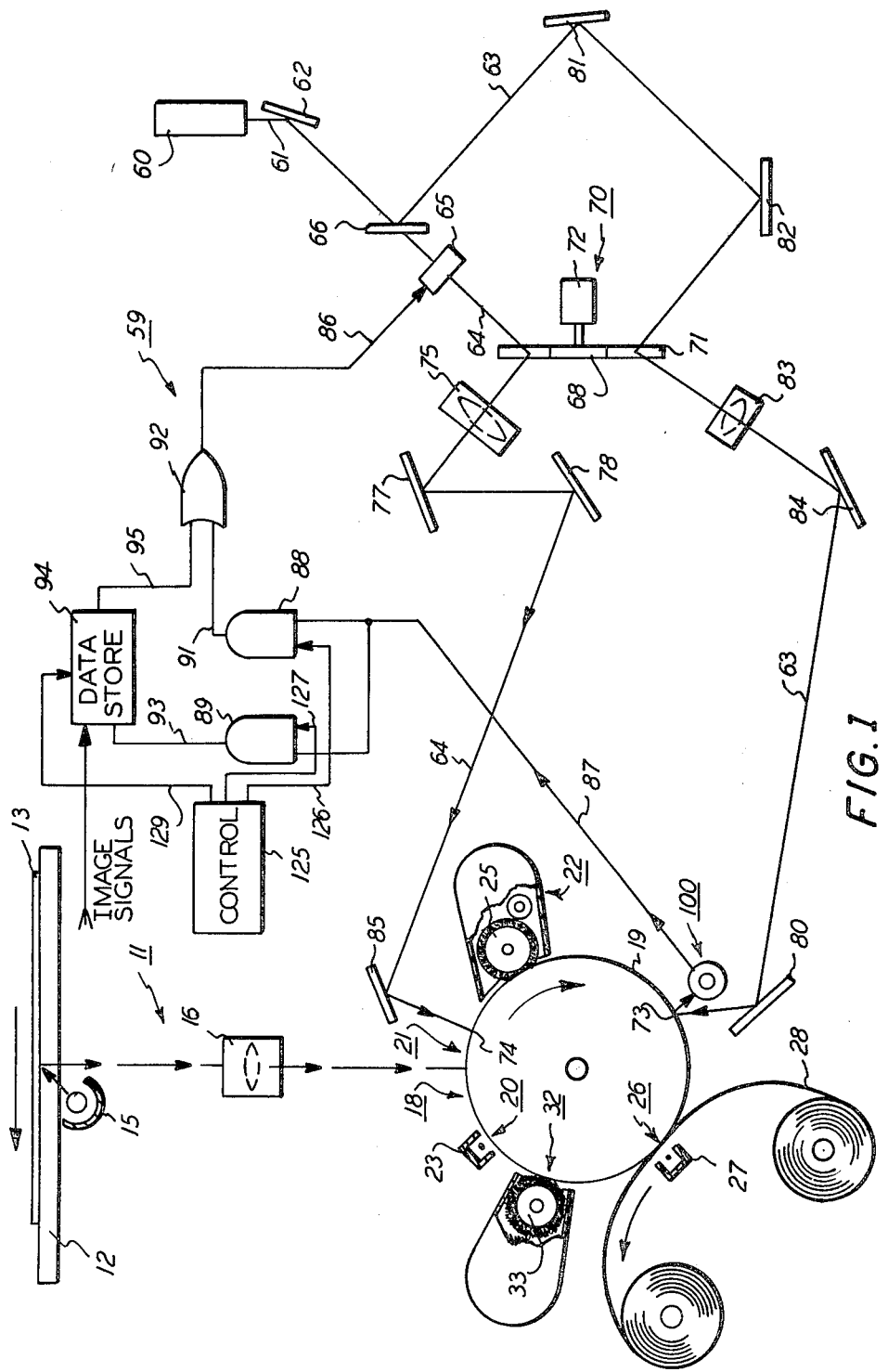
FIG. 1 is a schematic view showing apparatus for carrying out multiple function image processing in accordance with the teachings of the present invention.

Referring now particularly to FIG. 1 there is shown an exemplary xerographic type reproduction apparatus 10 incorporating the present invention. Xerographic reproduction apparatus 10 includes a viewing station or platen 12 where document originals 13 to be reproduced or copied are placed. For operation in the COPY mode as will appear more fully herein, a light/lens imaging system 11 is provided, the light/lens system including a light source 15 for illuminating the original 13 at platen 12 and a lens 16 for transmitting image rays reflected from the original 13 to the photoconductive surface 19 of a suitable photoconductor, exemplified herein by drum 18 at exposure station 21.

Charging, developing, transfer, and cleaning stations 20, 22, 26, 32 respectively are disposed about drum 18 in operative relation thereto. Charging station 20 includes a corona charging means 23 for depositing a uniform electrostatic charge on the photoconductive surface 19 of drum 18 in preparation for imaging. A suitable developing mechanism, which may for example comprise a magnetic brush 25, is provided at developing station 22 for developing the latent electrostatic images created on drum 18.

At transfer station 26, corona transfer means 27 effects transfer of the developed image to a suitable copy substrate material 28. A suitable drum cleaning device such as a rotating cleaning brush 33 is provided at cleaning station 32 for removing leftover developing materials from the surface 19 of drum 18. Brush 33 may be disposed in an evacuated housing through which leftover developer materials removed from the drum surface by the cleaning brush are exhausted.

In the example shown, photoconductive surface 19 comprises a uniform layer of photoconductive material such as amorphous selenium on the surface 19 of drum 18. Drum 18 is supported for rotation by suitable bearing means (not shown). A suitable drive motor (not shown) is drivingly coupled to drum 18 and rotates drum 18 in the direction shown by the solid line arrow when processing copies.

When operating in the COPY mode, the photoconductive surface 19 of drum 20 is charged to a uniform level by corona charging means 23. Platen 12 and the original document 13 thereon is irradiated by light source 15, the light reflected from document 13 being focused onto the photoconductive surface 19 of drum 18 by lens 16 at exposure station 21. Platen 12 and the document 13 thereon are at the same time moved in synchronism with rotation of the drum 18. The light reflected from the original 13 selectively discharges the charged photoconductive surface in a pattern corresponding to the image that comprises the original document.

The latent electrostatic image created on the surface 19 of drum 18 is developed by magnetic brush 25 and transferred to copy substrate material 28 through the action of transfer corona means 27. Following transfer, the photoconductive surface 19 of drum 18 is cleaned by cleaning brush 33 to remove leftover developer material. A suitable fuser or fixing device (not shown) fixes the image transferred to copy substrate material 28 to render the copy permanent.

While a drum type photoconductor is illustrated other photoconductor types such as belt, web, etc. may be envisioned. Photoconductive materials other than selenium, as for example organic may also be contemplated. And while a scan type imaging system is illustrated, other types of imaging systems such as full frame flash, may be contemplated.

Xerographic reproduction apparatus 10 includes a flying spot scanner 59. Scanner 59 has a suitable flux source of electro-magnetic radiation such as laser 60. The collimated beam 61 of monochromatic radiation generated by laser 60 is reflected by mirror 62 and separated by beam splitting partial mirror 66 into image reading beam 63 and image writing beam 64. Image writing beam 64 is input to a modulator 65 which modifies the beam 64 in conformance with information contained in image signals input thereto through lead 86, as will appear. Modulator 65 may comprise any suitable modulator, such as an acousto-optic or electro-optic type modulator for imparting the informational content of the image signals inputs thereto to beam 64. From modulator 65, beam 64 passes to disc deflector 68 of holographic deflection unit 70.

Image reading beam 63 is guided by mirrors 81, 82, into a separate path to disc deflector 68 of holographic deflector unit 70.

Image reading and writing beams 63, 64 are diffracted by disc deflector 68 to imaging lenses 75, 83 respectively. Deflector 68, which comprises a substantially flat disc-like element having a plurality of grating faces or facets 71 forming the outer periphery thereof, scans the beams 63, 64 across the photoconductive surface 19 of drum 18 in a direction substantially parallel to the axis of drum 18 (along the X-axis). As will be understood by those skilled in the art, rotation of drum 18 provides scanning movement along the Y-axis. Deflector 68, which is preferably glass, is driven by motor 72. Preferably, deflector 68 is disposed so that light beams 63,64 are incident to the facets 71 thereof at an angle of substantially 45°. The diffracted scanning beams output by deflector 68 are incident thereto at the complementary angle.

Imaging lens 75 is located in the optical path of image writing beam 64 between deflector 68 and mirror 77. Lens 75 is suitably dimensioned to receive and focus the scanning beam 64 diffracted by facets 71 of deflector 68 via mirrors 77, 78 and 85 to a preselected location in the focal plane proximate the surface 19 of drum 18 upstream of developing station 22.

Imaging lens 83 is located in the optical path of image reading beam 63 between deflector 68 and mirror 84. Lens 83 is suitably dimensioned to receive and focus the scanning beam 63 diffracted by facets 71 of deflector 68 via mirrors 84,80 to a preselected location in the focal plane proximate the surface 19 of drum 18 downstream of developing station 22. In the case where the photoconductive material is opaque, light from image reading beam 63 impinging on the surface 19 of drum 18 is reflectively scattered. The scatterred light, which is composed of both specular and diffuse reflected light, is collected in integrating cavity 100 and there converted to image signals as will appear. In the case where the photoconductive material is transparent, light is transmitted, depending on the degree of transparency of the photoconductive material, through the photoconductive material. The transmitted light, which is composed of both specular and diffuse transmitted light, is collected in integrating cavity 100 which in that circumstance would be suitably disposed within the photoconductive interior astride the light path.

In a preferred embodiment, the distance along the periphery of drum 18 between the location 73 where image reading beam 63 impinges on drum 18 and the location 74 where image writing beam 64 impinges on drum 18 is at least equal to the maximum dimension of the image along the Y-axis. This permits, in the multiple copy mode, generation of additional images with or without the use of memory to buffer the image signals.

Figure 2:
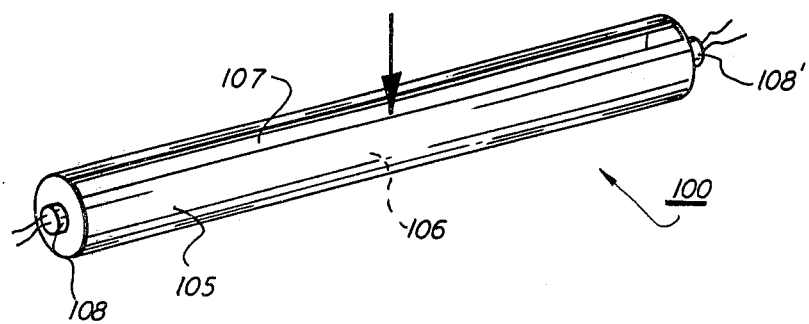
FIG. 2 is an isometric view of the integrating cavity.

Referring particularly to FIG. 2, integrating cavity 100 consists of elongated hollow cylindrical housing 105. In the exemplary apparatus shown in FIG. 1, housing 105 is disposed adjacent and in predetermined spaced relationship to the surface 19 of drum 18. Housing 105 is supported such that the longitudinal axis of housing 105 substantially parallels the axis of drum 18. Housing 105 is provided with an elongated slit-like aperture 107 in the wall thereof opposite the photoconductive surface 19 of drum 18, housing 105 being located such that light scattered from the drum surface and the developed image thereon passes through aperture 107 into the interior 106 of housing 105. A pair of photodetectors 108,108' are provided in housing 105 at the ends thereof, photodetectors 108,108' generating an analog image signal in output lead 87 in response to the presence or absence of light. To enhance the light responsiveness of housing 105, the interior wall 107 thereof is preferably finished with a highly reflective material such as a highly reflective lambertian coating.

Where the photoconductive material is transparent, housing is supported within the interior of drum 18 with aperture 107 thereof in the path of the transmitted light.

Referring again to FIG. 1, image signals produced by scanning the image developed on the photoconductive surface 19 of drum 18 in output lead 87 are fed to AND function gate pair 88,89. The output of gate 88 is coupled by lead 91 to OR function gate 92. The output of gate 92 is coupled to modulator 65 through lead 86.

The output of gate 89 is coupled by lead 93 to a suitable image data storage device or buffer 94. Buffer 94 may be used to store image signals obtained from reading the developed image on the photoconductive surface of drum 18 where a relatively large number of copies are to be made to obviate any degradation of the image due to repeated scanning and developing of the image, or in the case where it is not desired to make immediate copies of the developed image, or in the case where the relative distance between image reading and writing beams 63, 64 respectively is less than the dimension of the image along the Y-axis. Buffer 94 also serves to store or buffer image data from other sources.

A suitable controller 125 is provided for selectively enabling gate 88 or 89 to couple output lead 87 of integrating cavity 100 to either gate 88 and modulator 65 or to data storage buffer 89. Lead 126 and inverter 127 couple controller 125 with gates 88,89. Output lead 129 of controller 125 is coupled to buffer 94 to permit controller 125 to control output of image signals from buffer 94 to lead 95 and gate 92.

OPERATION

In the COPY mode, latent electrostatic images may be formed on the photoconductive surface 19 of drum 18 through exposure of the document 13 on platen 12, developed at developing station 22 and transferred to the copy substrate material 28 at transfer station 26 as described heretofore. The photoconductive surface 19 of drum 18 is thereafter cleaned by brush 33 at cleaning station 32 and the surface charged at charging station 20 in preparation for imaging. Where additional copies of the original 13 are desired, the cycle may be repeated the requisite number of times.

In the WRITE mode, latent electrostatic images are created on the charged photoconductive surface 19 of drum 18 by means of the flying spot scanner 59 in accordance with image signals input thereto from data storage buffer 94. In this mode, controller 125 actuates buffer 94 while disabling gates 88,89 to render image reading beam 63 inoperable. Modulator 65 modulates the light intensity of image writing beam 64 in accordance with the content of the image signals input thereto so that beam 64 dissipates the electrostatic charge on the drum surface to create a latent electrostatic image representative of the image signals input thereto as the beam 64 scans thereacross. The electrostatic latent image so created is thereafter developed by magnetic brush 25 and transferred to copy substrate material 28 by corona transfer means 27 at transfer station 26. Following transfer, the surface of drum 18 is cleaned by cleaning brush 33 as described.

In this mode, and in the image READ mode described below, deflector 68 is continually driven at substantially constant velocity by motor 72. In the WRITE mode, the image signal source is controlled so as to be synchronized with rotation of deflector 68. The rotational rate of xerographic drum 18 which determines the spacing of the scan line, is preferably synchronized to the signal source in order to maintain image linearity.

In the image READ mode where it is desired to read original 13 and convert the content thereof to image signals, a latent electrostatic image of the original 13 on platen 12 is created on the surface 19 of drum 18 through exposure of the original 13 and subsequent development by magnetic brush 25 in the manner described heretofore. As the developed image is carried on drum 18 from developing station 22 to transfer station 26, the image is scanned line by line by the image reading beam 63. The light from beam 63 is scattered and reflected by the drum surface in accordance with the presence or absence of toner to integrating housing 105, it being understood that where the light beam strikes toner, the light is absorbed and, with possible slight scattering, whereas where the light beam strikes an uncovered portion of the photoconductive surface 19, the light is scattered and reflected by the photoconductive surface. The presence or absence of light in housing 105 is sensed by photodetectors 108,108' to provide an analog image signal representative of the developed image scanned to output lead 87. Image signals output by photodetectors 108,108' may be routed through gate 88 directly to gate 92 and modulator 65 or via gate 89 and data storage buffer 94 to gate 92 and modulator 65 where it is desired to produce additional copies of the original 13 without re-exposing the original 13. Image signals may in any case be routed to data storage buffer 94 for storage, transmittal, etc.

Following scanning, the developed image on drum 18 may be transferred to substrate material 28 in the manner described heretofore. Alternately, transfer may be dispensed with and the drum surface cleaned by cleaning brush 33.

Operation in the multiple copy mode typically involves operational sequences of COPY, WRITE, and READ modes described heretofore. Initially, and for the first copy, an original document 13 on platen 12 is exposed using light/lens system II as in the COPY mode. The latent electrostatic image is developed at developing station 22 by magnetic brush 25.

Where a single copy of document 13 is desired, the developed image is transferred to copy substrate material 28, drum 18 cleaned, and the process terminated as in the COPY mode.

Where additional copies of document 13 are desired, scanner 59 is actuated after a predetermined delay sufficient for the original latent electrostatic image created on drum 18 to pass the location 74 where image writing beam 64 impinges on drum 18. Actuation of scanner 59 initiates scanning of drum 18 by both image reading beam 63 and image writing beam 64. Image reading beam 63 scans the developed image on drum 18 as the developed image passes location 73 as in the image READ mode. The analog image signals produced are input to gate 88 through lead 87.

In the multiple image mode, a signal from controller 125 in lead 126 enables gate 88, and the image signals produced by detectors 108,108' are input through lead 91, gate 92 and lead 86 directly to modulator 65. Modulator 85, accordingly modulates the image writing beam 64 in accordance with the image signals to produce a second latent electrostatic image of the original on the photoconductive surface 19 of drum 18 as in the READ mode.

The first developed image (i.e. the image initially scanned by image reading beam 63) is transferred to copy substrate material 28 and the surface of drum 18 cleaned and recharged in preparation for imaging as described heretofore.

Where only one additional copy is desired, scanner 59 may be inactivated following completion of the combined image reading/writing by light beams 63,64. The latent electrostatic image written by image writing beam 64 is developed at developing station 22 and transferred to copy substrate material 28 to provide the second copy. Drum 18 is thereafter cleaned and recharged as described heretofore.

Where additional copies are desired, scanner 59 is held energized to enable image reading beam 63 to scan developed images and image writing beam 64 to write additional images in accordance with the image signals produced by scanning the developed images until the desired number of copies are produced. Following the last copy, scanner 59 is de-energized as described.

Where a substantial number of copies are to be made as for example five or more, image degradation and loss may occur as succeeding images are scanned. In this circumstance, to avoid any degradation and image loss, the image signals generated by scanning the first developed image with image reading beam 63 are input to data storage buffer 94 as well, controller 125 enabling via leads 126, 127 both gates 88 and 89 for this purpose. For subsequent copies, image signals are read from buffer 94 rather than from integrating cavity 100.

It will be understood that the number of successive copies that may be made without objectionable image degradation and loss may vary with the type of reproduction apparatus used and accordingly, the number of successive copies that may be made without objectionable image degradation and loss may be greater or less than the example given.

It it understood that the absence of input image signals in lead 86 to modulator 65, as during the READ mode, holds modulator 65 in a condition where image writing beam 64 is prevented from impinging on the photoconductive surface 19 of drum 18. To accommodate the image WRITE mode, suitable means (not shown) may be provided to divert or absorb image reading beam 63. And, while a single light source, i.e. laser 60, together with beam splitting apparatus is disclosed, a pair of discrete light sources such as a pair of lasers 60 may instead be contemplated. In that circumstance, the aforedescribed beam splitting apparatus would be discarded.

While in the multiple copy mode, a document 13 is described as being the source of the first image, it will be understood that the original may be in the form of image signals from a suitable source such as another scanning apparatus, memory, etc. In that instance, the image signals are input via buffer 94, to create the desired number of images through image writing beam 64.

And while image signals for additional copies are described as being generated by scanning developed images on drum 18, other arrangements may be perceived such as scanning the latent electrostatic image before development and sensing the changes in light intensity due to the various charge levels that represent the image. In that circumstance, the relative disposition of the locations 73,74 where image reading and writing beams 63,64 impinge on drum 18 and the disposition of developing station 22 may be altered to permit simultaneous reading of the previous image and writing of the next image.

Where it is desired to avoid or minimize the use of holding buffers when operating in the multiple copy mode, spacing between the location 73 where image reading beam 63 impinges on drum 18 and the location 74 where image writing beam 64 impinges on drum 18 must at least equal the dimension of the image along the Y-axis as described heretofore. Where the dimension is less, the image writing beam 64 may scan previously imaged areas with consequent destruction or mutilation of the previous latent image.

Where it is desired to reduce the distance between the locations where image reading and writing beams 63, 64 impinge on drum 18 to a distance less than the dimension of the image, the image signals or a portion thereof generated by reading the image on drum 18 may be temporarily stored in buffer 94 until the image being read has passed the location where image writing beam impinges on drum 18. Image writing beam 64 may then be activated to reproduce the latent electrostatic image from image signals input thereto through buffer 94.

It is understood that the reverse scan direction may be corrected electronically as by the use of a first in—last out memory buffer in the output line or may be performed by suitable optical means, such as scanning both beams with the same deflector facet.

While the invention has been described with reference to the structure disclosed, it is not confined to the details set forth, but is intended to cover such modifications or changes as may come within the scope of the following claims:

What is claimed is:

1. In a copying apparatus having a photoreceptor, means to charge said photoreceptor in preparation for imaging, exposure means for exposing said charged photoreceptor to an original to produce a latent electrostatic image thereof, developing means for developing said image, and transfer means for transferring said developed images to copy substrate material, the improvement comprising:

image reading means for reading images on said photoreceptor to produce image signals representative of said image; and image writing means for exposing said photoreceptor in accordance with said image signals to reproduce said latent electrostatic image on said photoreceptor to provide duplicate images without using said original.

2. The apparatus according to claim 1 including:

at least two beams of electro-magnetic radiation;

means to focus a first of said beams to a location on said photoreceptor upsteam of said developing means and a second of said beams to a location on said photoreceptor downstream of said first beam;

scanning means for scanning said first and second beams across said photoreceptor;

said image reading means including means for converting changes in radiation from scanning images on said photoreceptor with said second beam to image signals representative of the image scanned;

said image writing means including means for modulating said first beam in accordance with said image signals to reproduce said latent electrostatic image.

3. The apparatus according to claim 2 in which said developing means is disposed between said first and second beams whereby to develop images on said photoreceptor before scanning by said second beam;

said converting means converting radiation changes from scanning developed images to image signals.

4. The apparatus according to claim 3 in which first and second said beams are comprised of high intensity light, said reading means including a light collecting member for collecting light from scanning developed images on said photoreceptor with said second light beam.

5. The apparatus according to claim 1 including:
a high intensity light beam;
scanning means for scanning said light beam across said photoreceptor; and
means for separating said light beam into plural beams and guiding a first of said light beams to a predetermined location on said photoreceptor for writing images on said photoreceptor and a second of said light beams to a second predetermined location on said photoreceptor downstream of said first light beam for reading images on said photoreceptor.

6. The apparatus according to claim 1 including buffer means for temporarily storing at least a portion of said image signals produced by said image reading means pending use by said image writing means.

7. The apparatus according to claim 1 in which the distance between the location where said image reading means reads an image and the location where said image writing means writes a latent electrostatic image is at least equal to the dimension of said image.

8. In a copying apparatus, the combination of:
a viewing station for an original to be copied;
a photoconductor;
means to charge said photoconductor;
illumination means for iluminating said viewing station;
optical means for focusing image rays from said viewing station onto said photoconductor to expose said photoconductor and produce a latent electrostatic image of the original on said photoconductor;
means for developing said latent image;
transfer means to transfer said developed image to copy substrate material;
cleaning means for removing leftover developing material from said photoconductor;
means providing image writing and reading beams of high intensity light;
means for impinging said image writing beam to a preset location on said photoconductor upstream of said developing means and said image reading beam to a preset location on said photoconductor downstream of said developing means;
scanning means for scanning said beams across said photoconductor;
means responsive to changes in light from scanning said developed image with said image reading beam to produce image signals representative of the developed image scanned; and
means for modulating said image writing beam in response to said image signals to produce at least one duplicate image of said developed image without using said original.

9. The copying apparatus according to claim 8 including:
buffer means for said image signals: and
control means for outputting said image signals from said buffer means to said image writing beam;
modulating means to produce additional duplicate images without using said original.

10. A method of producing multiple copies of an original in which the original is only required for the first copy, comprising the steps of:
(a) for a first copy, producing a latent electrostatic image of the original on a charged photoconductive surface;
(b) for a second copy, raster scanning the image with a first flying spot beam to provide video image signals representative of the image scanned; and re-exposing said photoreceptor by scanning the photoreceptor with a second flying spot beam modulated in accordance with the image signals produced by raster scanning the preceding image to provide a second latent electrostatic image of said original;
(c) repeating step b to provide additional images; and
(d) for each image produced, developing the image either before or after said raster scanning and transferring said developed images to a copy substrate material.

11. The image processing method according to claim 10 including the steps of:
(a) storing the image signals in memory; and
(b) for additional images, modulating said second flying spot beam with said image signals drawn from said memory.

12. The image porcessing method according to claim 10 including the step of:
scanning said image after development with said first flying spot beam.

13. The method of processing images, the steps which comprise:
producing a latent electrostatic image on a charged photoconductive surface by exposing an original at a viewing station;
scanning said image to provide image signals representative of said image; and
using said image signals, exposing a subsequent area of said photoconductive surface to provide a second latent electrostatic image of said original.

14. The method according to claim 13 including the step of scanning said latent electrostatic image to provide said image signals and exposing said photoconductive surface with said image signals in real time.

15. The method of processing images, the steps which comprise:
(a) producing a latent electrostatic image on a charged photoconductive surface by exposing an original at a viewing station;
(b) developing said latent electrostatic image;
(c) scanning the image developed on said photoconductive surface with an unmodulated flying spot beam;
(d) converting reflections produced by scanning said developed image to image signals representative of the developed image scanned; and
(e) exposing said photoconductive surface using said flying spot beam modulated in accordance with image signals derived from scanning said developed image for additional ones of said original.

16. The method according to claim 15 including the steps of:
(a) developing each additional latent electrostatic image produced by exposing with said flying spot beam;
(b) transferring each additional developed image to copy substrate material; and
(c) cleaning said photoconductive surface following transfer of each developed image.

17. In a copying apparatus having a photoreceptor, means to charge said photoreceptor in preparation for imaging, exposure means for exposing said charged photoreceptor to produce latent electrostatic images, developing means for developing said images, and transfer means for transferring said developed images to copy substrate material, the improvement comprising:

(a) a beam of electro-magnetic radiation;
(b) means to focus said beam onto said photoreceptor at a location downstream of said developing means to enable said beam to scan images on said photoreceptor after said images ae developed;
(c) scanning means for scanning said beam across said photoreceptor and the developed images thereon; and
(d) means for collecting radiation from said photoreceptor as said beam scans across said photoreceptor and the developed images thereon and converting said radiation to image signals representative of the developed images scanned.

18. The apparatus according to claim 17 in which said beam of electro-magnetic radiation comprises:
a high intensity light beam.

* * * * *

UNITED STATES PATENT AND TRADEMARK OFFICE
CERTIFICATE OF CORRECTION

PATENT NO. : 4,320,955

DATED : March 23, 1982

INVENTOR(S) : David B. Kay et al

It is certified that error appears in the above-identified patent and that said Letters Patent are hereby corrected as shown below:

Cover page, section [75] Inventor, after "Rochester", insert

--and Charles J. Kramer, Pittsford, both of--

Signed and Sealed this

Twenty-fifth Day of May 1982

[SEAL]

Attest:

*Attesting Officer*

GERALD J. MOSSINGHOFF

*Commissioner of Patents and Trademarks*